United States Patent [19]
Voigt

[11] Patent Number: 6,092,168
[45] Date of Patent: Jul. 18, 2000

[54] DATA STORAGE SYSTEM AND METHOD FOR DEALLOCATING SPACE BY WRITING AND DETECTING A PREDEFINED DATA PATTERN

[75] Inventor: Douglas L. Voigt, Boise, Id.

[73] Assignee: Hewlett-Packard Co., Palo Alto, Calif.

[21] Appl. No.: 08/738,132

[22] Filed: Oct. 25, 1996

[51] Int. Cl.$^7$ .................................................. G06F 12/00
[52] U.S. Cl. ..................... 711/170; 711/173; 707/205; 710/56
[58] Field of Search ...................... 395/460, 486, 395/621, 622, 674, 876; 711/141, 120, 154, 173; 707/205, 206; 364/468.05; 710/56; 709/104

[56] References Cited

U.S. PATENT DOCUMENTS

| | | | |
|---|---|---|---|
| 4,210,931 | 7/1980 | Bailey et al. ............................ | 386/112 |
| 4,884,269 | 11/1989 | Duncanson et al. ..................... | 370/251 |
| 5,193,184 | 3/1993 | Belsan et al. ........................... | 395/404 |
| 5,218,695 | 6/1993 | Noveck et al. .......................... | 707/205 |
| 5,237,679 | 8/1993 | Wang et al. ............................. | 395/622 |
| 5,293,388 | 3/1994 | Monroe et al. ....................... | 714/752.5 |
| 5,319,776 | 6/1994 | Hile et al. ................................ | 395/186 |
| 5,321,834 | 6/1994 | Weiser et al. ........................... | 395/622 |
| 5,410,671 | 4/1995 | Elgamal et al. ......................... | 711/202 |
| 5,461,483 | 10/1995 | Nakajima ................................ | 358/296 |
| 5,485,613 | 1/1996 | Engelstad et al. ...................... | 395/622 |
| 5,488,365 | 1/1996 | Seroussi et al. .......................... | 341/51 |
| 5,490,280 | 2/1996 | Gupta et al. ............................ | 395/800 |
| 5,491,810 | 2/1996 | Allen ....................................... | 711/117 |
| 5,561,786 | 10/1996 | Morse .................................... | 711/170 |
| 5,594,887 | 1/1997 | Osaka .................................... | 711/144 |
| 5,604,902 | 2/1997 | Burkes et al. ........................... | 395/622 |
| 5,623,314 | 4/1997 | Retter et al. ............................. | 348/423 |
| 5,630,093 | 5/1997 | Holzhammer et al. ................. | 711/115 |
| 5,646,684 | 7/1997 | Nishizawa et al. ..................... | 348/231 |
| 5,652,883 | 7/1997 | Adcock .................................. | 395/622 |
| 5,784,699 | 7/1998 | McMahon et al. ..................... | 711/171 |
| 5,852,805 | 12/1998 | Hiratsuka et al. ...................... | 704/500 |

OTHER PUBLICATIONS

Peter Norton, "The Norton Utilities Advanced Edition," 1988, pp. 212–215.

*Primary Examiner*—Eddie P. Chan
*Assistant Examiner*—Hong Kim

[57] ABSTRACT

A data computing system has a host computing unit connected to a peripheral data storage system. The data storage system has a storage medium and a storage space manager to manage space on the storage medium. When the host computing unit deallocates a designated storage space by deleting a file or moving data, the host generates a predefined data pattern and writes that data pattern to the storage space being deallocated. The peripheral data storage system detects the predefined pattern and, in response, deallocates the designated storage space to which the data pattern is being written. As a result, the data storage system now reflects the deallocation that has already been realized by the host software. When the host initiates a read operation for a designated storage space, the data storage system determines whether the storage space is presently unallocated. If it is, the data storage system generates the predefined data pattern and sends that pattern back to the host. In this manner, the technique takes advantage of standard write/read protocols to facilitate communication of space management information between the host and data storage system.

21 Claims, 5 Drawing Sheets

DATA STORAGE SYSTEM AND METHOD FOR DEALLOCATING SPACE BY WRITING AND DETECTING A PREDEFINED DATA PATTERN

FIELD OF THE INVENTION

This invention relates to data storage systems and methods for deallocating space on the data storage systems.

BACKGROUND Of THE INVENTION

Storage management tasks have historically been performed in host software executing at a host computing unit and external to a storage system. The host software managed the storage space, including allocation and deallocation of the memory space.

In recent years, data storage systems have evolved to a point where they perform many storage management tasks in conjunction with, or independent of, the host software. As the management functions increase on the peripheral storage system, there is a continuing need to improve communication between the host software and the data storage system. One particular instance for this improved communication is when the host software deallocates some area of storage without informing the peripheral storage management system. The effectiveness of the data storage system can be improved if it is routinely informed when the host deallocates space because the data storage system can likewise deallocate that space and use it for other purposes.

One prior art solution is to have the host generate an express command each time it deallocates space, and transfer that command to the peripheral storage management system to alert the peripheral that the space has been deallocated at the host. One drawback with this approach is that the command must penetrate several layers of software from the host to the peripheral storage management system, often requiring customization of the command for different file systems or software/firmware interfacing layers. Another drawback concerns synchronization of the deallocation procedure at the data storage system in response to the host command. Upon receipt of the command to deallocate a space, the data storage system must synchronize the deallocation of that space in a manner which does not interfere with possible other users who might be allocating that same space.

U.S. Pat. No. 5,193,184 to Belsan et al. proposes another solution in which the peripheral data storage system monitors for administration information to indicate when the host has deallocated space. The administration information is generated in a manner transparent to the host. However, this method also suffers from the synchronization problem, in that the peripheral storage management system must still coordinate deallocation of the storage space in a manner which avoids access conflicts. The inventor has developed a system and methods which solve the above problems.

SUMMARY OF THE INVENTION

A data computing system has a host computing unit connected to a peripheral data storage system. When the host computing unit deallocates a designated storage space by deleting a file or moving data, the host generates a predefined data pattern and writes that data pattern to the storage space being deallocated. The predefined data pattern is posted to the data storage system without alteration. This write can be performed in response to each host deallocation operation or as part of a background process run by the host to collect free space.

The data storage system detects the predefined pattern posted by the host and, in response, deallocates the designated storage space to which the data pattern is being written. As a result, the data storage system now reflects the deallocation that has already been realized by the host software.

When the host initiates a read operation for a designated storage space, the data storage system determines whether the storage space is presently unallocated. If it is, the data storage system generates the predefined data pattern and sends that pattern back to the host. In this manner, the same data pattern last written to the storage unit is returned to the host.

This technique takes advantage of standard write/read protocols to facilitate communication of space management information between the host and peripheral data storage system. Additionally, the technique eliminates synchronization problems with the host since after deallocation of a particular space, any read of that space is precisely the data which was last written to it.

DESCRIPTION OF THE DRAWINGS

The same reference numbers are used throughout the drawings to reference like components and features.

DETAILED DESCRIPTION OF THE INVENTION

Figure 1:
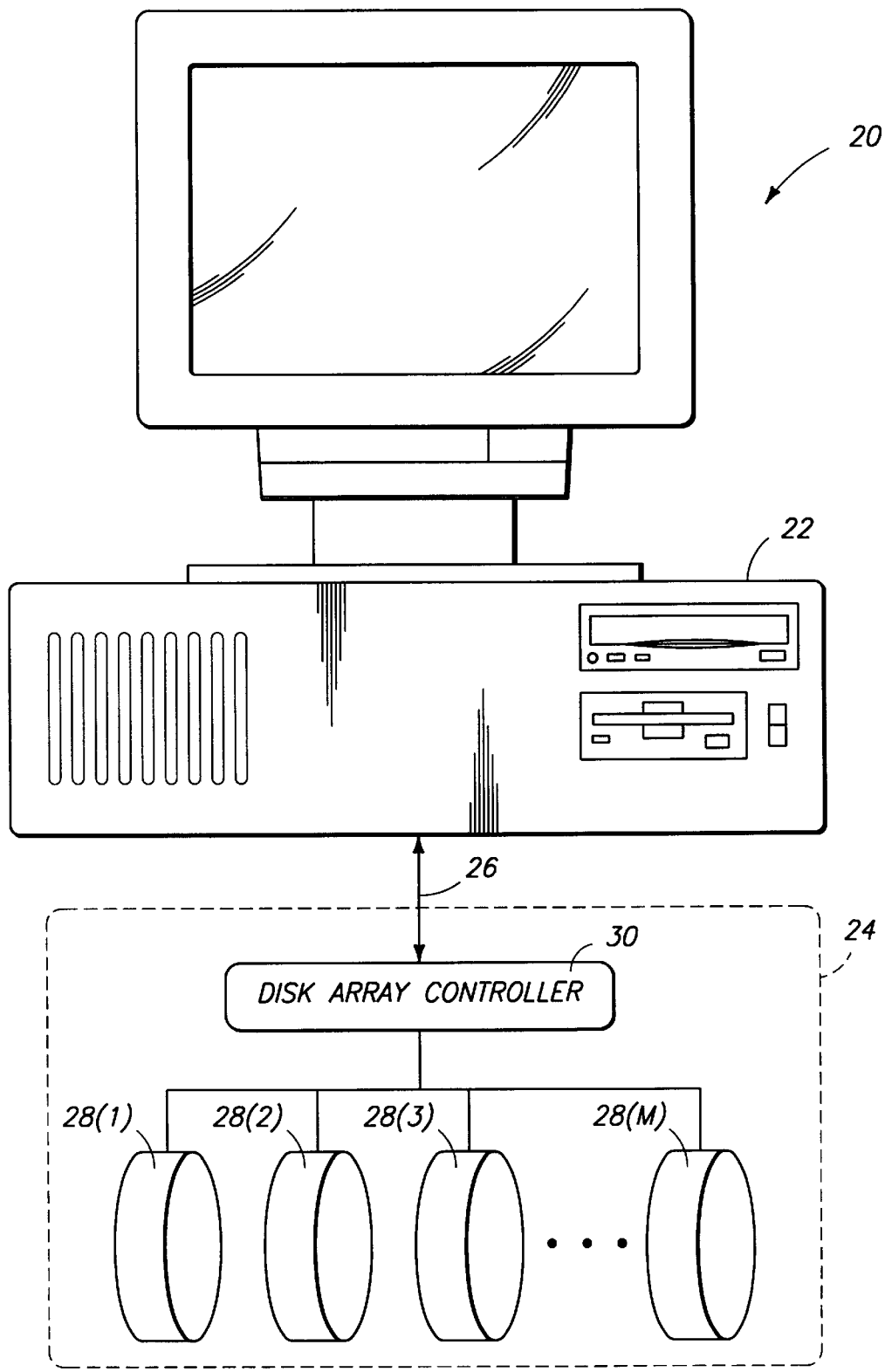
FIG. 1 is a diagrammatic view of a computing system having a host computing unit and a data storage system.

FIG. 1 shows a data computing system 20 having a host computing unit 22 and a peripheral data storage system 24. The host computing unit (or simply "host") 22 is illustrated as a desktop personal computer, although other computers may be used, such as a workstation, minicomputer, mainframe, and the like. The host 22 is coupled to the data storage system 24 via a connector 26, such as a SCSI (Small Computer System Interface) bus. The data storage system 24 is configured as a disk array having multiple storage disks 28(1), 28(2), 28(3), . . . , 28(M) and a disk array controller 30 to coordinate data transfer to and from the storage disks. The data computing system 20 is a general purpose computer and can be configured for many different ways, including as a network server for a LAN (local area network) or WAN (wide area network), or as a content server for the Internet.

Storage disks 28(1)–28(M) are illustrated for discussion purposes. In addition to storage disks, other types of storage media may be used, with examples including rewritable optical disks, tape storage devices, floppy disks, solid state memory (EPROMs, EEPROMs, etc.), PCMCIA memory cards, and other types of non-volatile, randomly accessible, rewritable storage devices.

Figure 2:
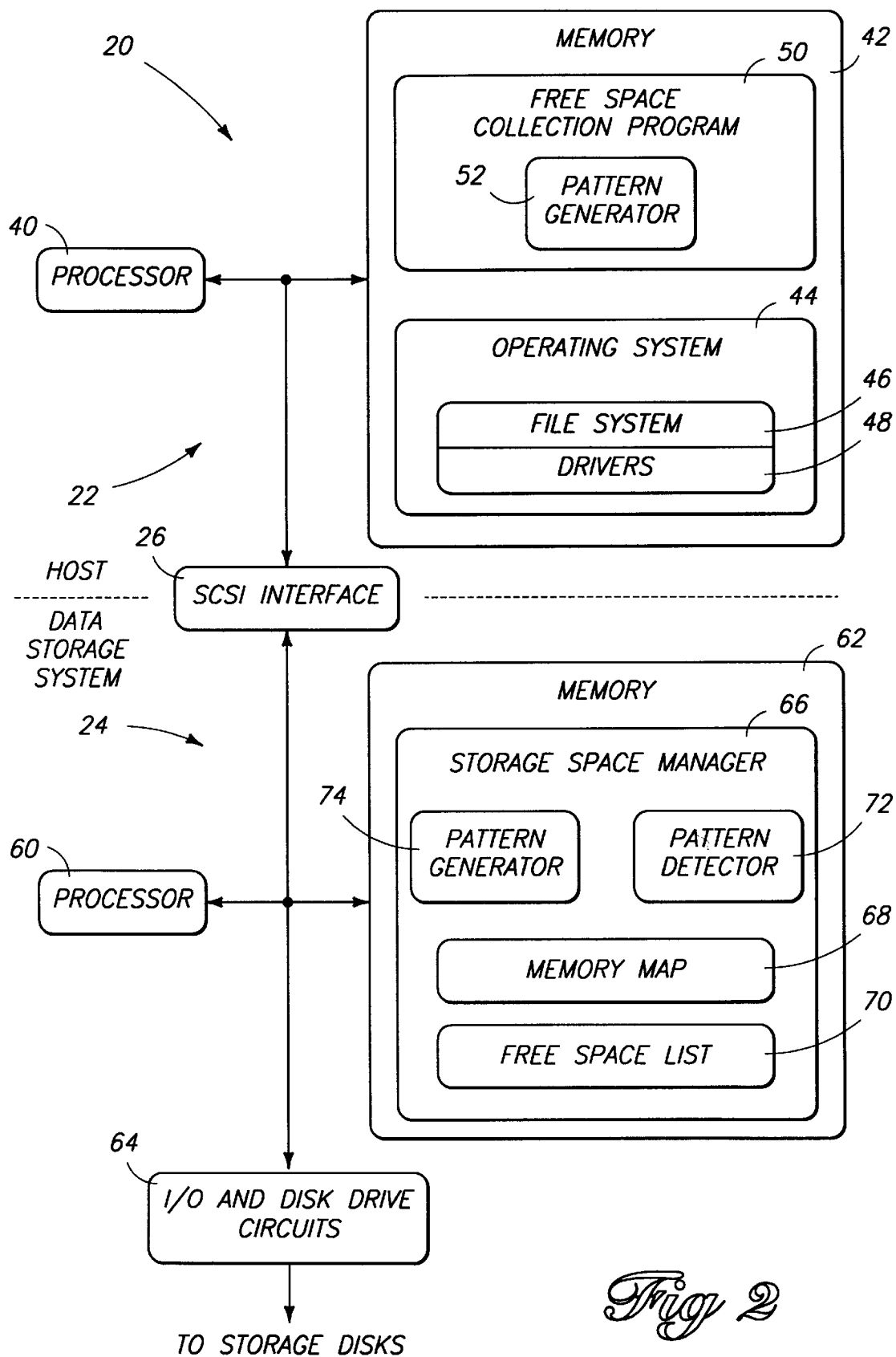
FIG. 2 is a block diagram of the computing system.

FIG. 2 shows functional components of the data computing system 20. The host computing unit 22 is a conventional server having a processor 40 (e.g., a microprocessor) and memory 42 (e.g., ROM, RAM, hard disk drive, floppy disk drive, CD-ROM, etc.). The host 22 executes an operating system 44 (e.g., UNIX, Windows® NT, etc.) having a file system 46 for defining the structure in which data files are named, stored, and organized. The file system 46 includes files, directories, and the information needed to locate and access these items. The file system 46 accesses the storage unit in conventional fashion using software drivers 48 and standard hard disk protocols. As an alternative to file system 46, the host can have another type of facility that manages storage, such as a database.

The host computing unit 22 runs a free space collection program 50 in conjunction with the file system 46. The free space collection program 50 cleans up files and data items that have been deallocated on the host's virtual memory by the host's file system 46 during normal operations such as file deletion, data movement, and the like. The free space collection program 50 includes a pattern generator 52 which generates a predefined data pattern to be written out to the physical storage space on the data storage system 24 which corresponds to the deallocated virtual memory at the host. The data pattern can be essentially any arbitrary pattern so long as both the host and data storage system recognize the pattern as meaning the associated storage space is unallocated. One example implementation is to formulate a repeating single byte pattern, such as a repeating hexadecimal 55 byte pattern (0101,0101), which is the same as a decimal 85, or an alternating bit pattern of binary "0"s and "1"s. As an alternative, the predefined data pattern might consist of all binary "0"s or all binary "1"s. The data pattern is used to inform the peripheral data storage system 24 that the data blocks being written to have been deallocated by the host computing unit 22.

The free space collection program 50 is shown as a separate software component stored in memory 42 and executable on the processor 40, but it can also be incorporated as part of the file system 46. The host 22 writes the predefined data pattern out through the software drivers 48, over the SCSI interface 26, where it is posted at the data storage system 24 according to conventional write processes.

The data storage system 24 has a processor 60 and memory 62 which form the disk array controller 30, and hardware I/O (input/output) and disk drive circuits 64 which handle the hardware level data I/O to the disk drives. The data storage system 24 has a storage space manager 66 which is shown implemented as a software module stored in memory 62 and executable on the processor 60. The storage space manager 66 manages storage space on the storage disks and includes a memory map 68 which maintains virtual mapping information for mapping logical volumes onto the physical disk space.

The storage space manager 66 also has a free space list 70 which tracks the data blocks that are presently free or unallocated. The list might alternatively be incorporated into the memory map 68.

The storage space manager 66 has a pattern detector 72 which detects the predefined data pattern when that pattern is written from the host 22. Upon detection, the pattern detector 72 sends a message to the memory map 68 and free space list 70 to deallocate the storage space to which the data pattern is being written. The storage space manager 66 also has a pattern generator 74 which generates the predefined data pattern in response to a read operation of storage space that is unallocated. The generated data pattern is sent back to the host 22. If any writes occur between deallocation and reading, the data would be written to newly allocated space. In this manner, the data returned to the host during a read will always be the last data that was written to the storage location, regardless of the order of allocation/deallocation events on the host or storage system. The storage space manager 66 provides ordering control of individual read/write allocation and deallocation operations to avoid incorrect representation of data.

Figure 3:
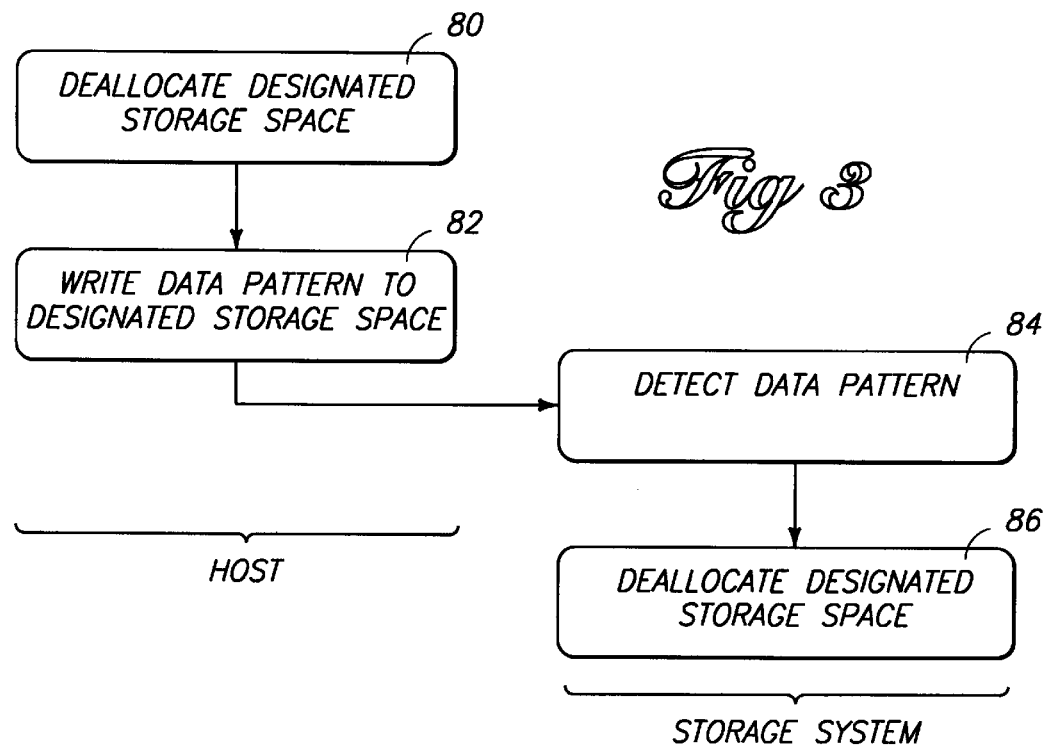
FIG. 3 is a flow diagram of steps in a method for deallocating space on the data storage system.
Figure 4:
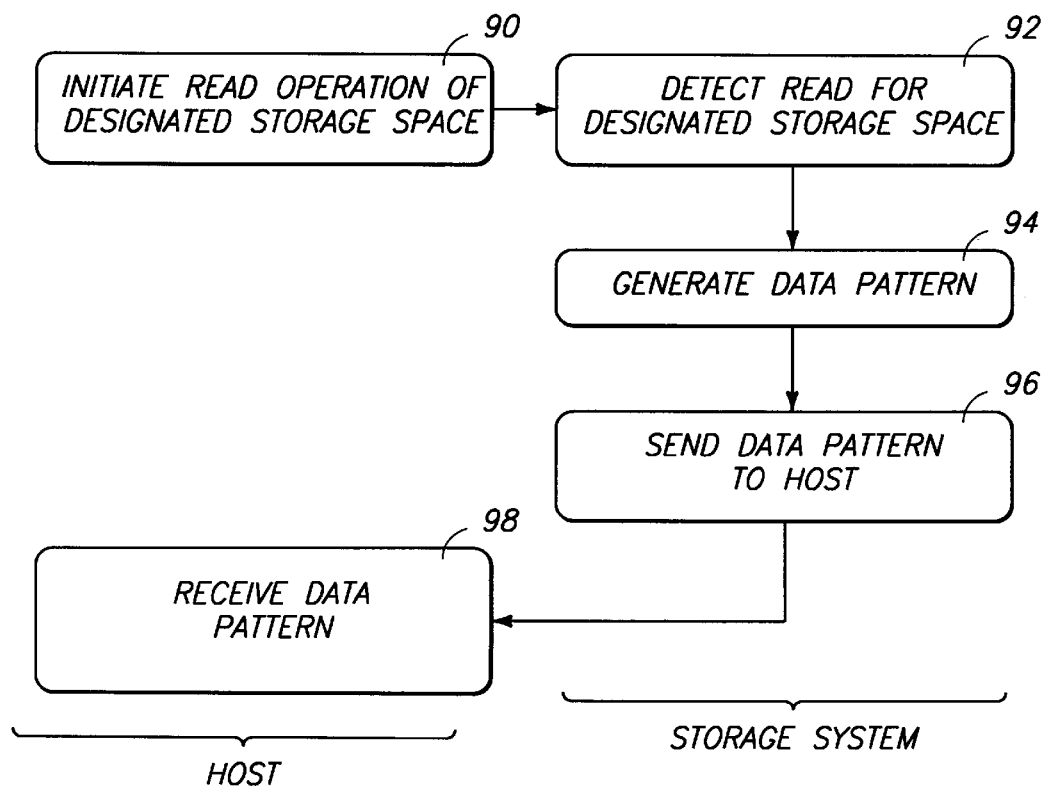
FIG. 4 is a flow diagram of steps in a method for reading an unallocated space on the data storage system.

FIGS. 3 and 4 show general methods for deallocating storage space on the data storage system and for reading unallocated storage space. The steps are performed by the host computing unit 22 and the data storage system 24, as indicated in the figures. These methods are described with reference to FIGS. 1 and 2.

At step 80 in FIG. 3, the host 22 deallocates a designated storage space by deleting a file, moving data, or other operation. The free space collection program 50 is informed of the deallocated space and causes the pattern generator 54 to generate the predefined data pattern. The host 22 writes the predefined data pattern to the designated storage space on the peripheral data storage system (step 82 in FIG. 3). The write operation uses standard protocols which are in practice today. The predefined data pattern is passed without alteration through the SCSI interface 26 to the data storage system 24.

It is noted that the host computing unit can write the data pattern as part of the deallocation operation. Alternatively, the pattern writing process may be performed in background during routine batch collection of deallocated free space on the host's virtual memory.

At step 84 in FIG. 3, the pattern detector 72 of the data storage system 24 detects the predefined pattern posted by the host computing unit 22 over the SCSI interface 26. In response to this detection, the pattern detector 72 instructs the memory map 68 and/or free space list 70 to deallocate the designated storage space to which the data pattern is being written. At this point, the predefined data pattern may actually be written onto the physical blocks of the designated storage space, or not, depending upon the implementation.

Now, suppose the host computing unit 22 decides to read the designated storage space which has been previously deallocated. At step 90 in FIG. 4, the host 22 initiates a read operation of the designated storage space. The read operation is performed according to standard disk access protocols. At step 92 in FIG. 4, the storage space manager 66 in the data storage system 24 examines the read operation in light of the memory map 68 and free space list 70 to determine whether the storage space designated in the read operation is presently unallocated. If it is, the pattern generator 74 generates the predefined data pattern (step 94 in FIG. 4) and sends the data pattern back to the host 22 (step 96 in FIG. 4). At step 98 in FIG. 4, the host 22 receives the data pattern as it was last written.

Figure 5:
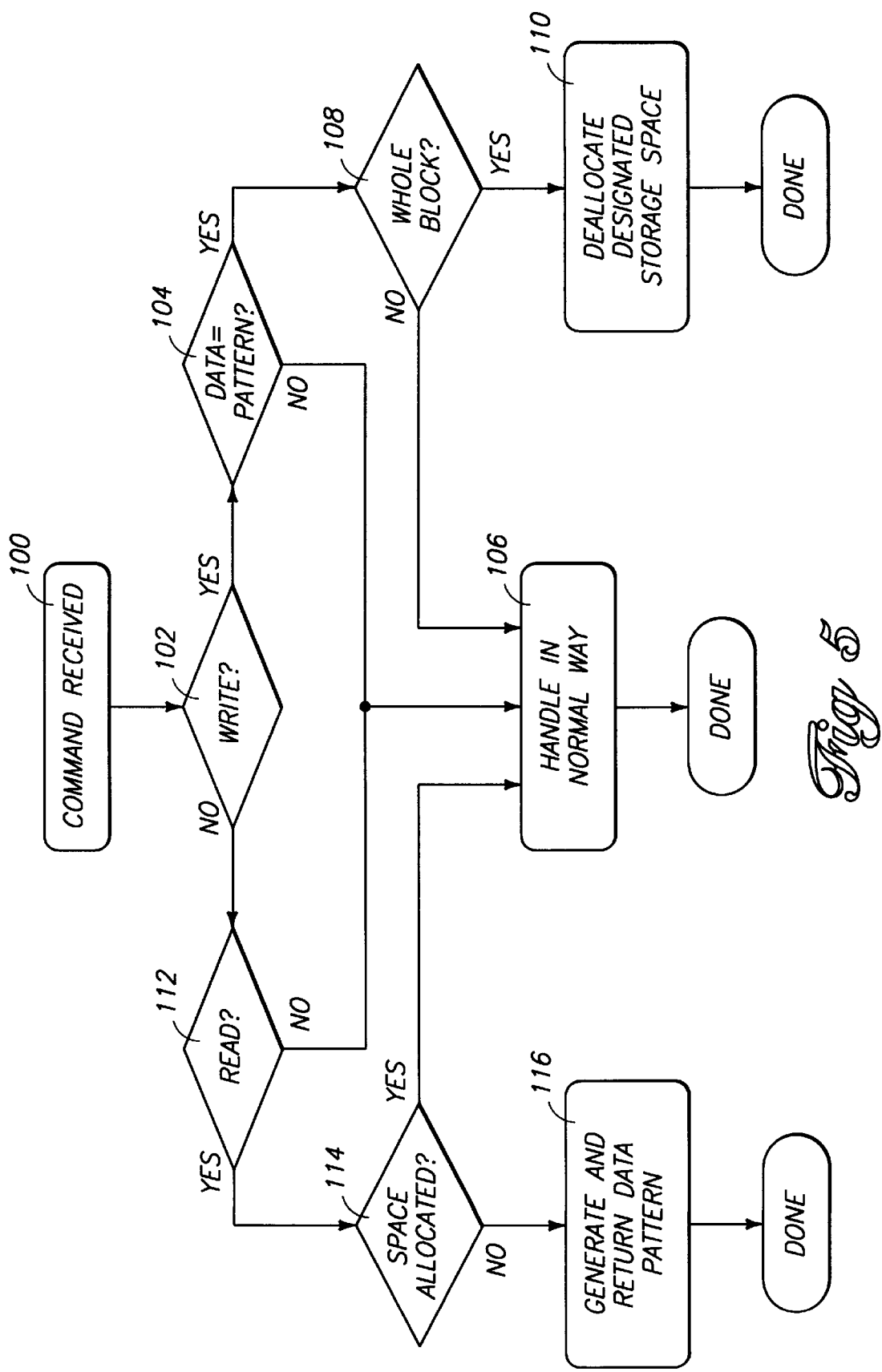
FIG. 5 is a flow diagram of steps in a method for operating the data storage system in response to commands from the host computing unit.

FIG. 5 shows one possible implementation of a process implemented by the storage space manager 66 in response to a command received from the host computing unit 22. At step 100, the storage space manager 66 receives a command from the host 22. The command might be a read, a write, or a different operation. At step 102 in FIG. 5, the storage space manager 66 determines whether the command is a write command. If it is (i.e., the "yes"branch from step 102), the storage space manager 66 next evaluates whether the data being written entirely consists of the predefined data pattern (step 104 in FIG. 5). If the data being written is not entirely the data pattern (i.e., the "no" branch from step 104), the storage space manager handles the command according to normal techniques, such as writing the data (including the data pattern) to the designated storage space (step 106 in FIG. 5).

Conversely, if the data being written consists entirely of the predefined data pattern (i.e., the "yes" branch from step 104), the storage space manager 66 evaluates whether the predefined data pattern consumes one or more full data blocks (step 108 in FIG. 5). If the data pattern only partially fills a block of physical memory (i.e., the "no" branch from step 108), the storage space manager 66 uses normal techniques to resolve the command, such as writing the data pattern to the location contained within the block (step 106 in FIG. 5). On the other hand, if the data pattern fills one or more whole blocks of memory (i.e., the "yes" branch from step 108), the storage space manager 66 deallocates the designated storage space in block-size amounts (step 110 in FIG. 5). A "block" is a unit of data that is manipulated by the storage space manager 66 and can be of arbitrary size.

Returning to step 102, if the command received from the host computer is not a write operation (i.e., the "no" branch from step 102), the storage space manager 66 checks to see if the command is a read operation (step 112 in FIG. 5). If the command is not a read (i.e., the "no" branch from step 112), the storage space manager 66 handles the command in normal fashion (step 106). If the command is a read operation (i.e., the "yes" branch from step 112), the storage space manager 66 examines the memory map 68 and/or free space list 70 to determine whether storage space being read is currently allocated (step 114 in FIG. 5). If the space is allocated (i.e., the "yes"branch from step 114), the storage space manager 66 initiates a read of the storage space using standard techniques (step 106). On the other hand, if the space being read is unallocated (i.e., the "no" branch from step 114), the pattern generator 74 generates the predefined data pattern and returns that pattern to the host 22 to inform the host that the space is unallocated (step 116 in FIG. 5).

Figure 6:
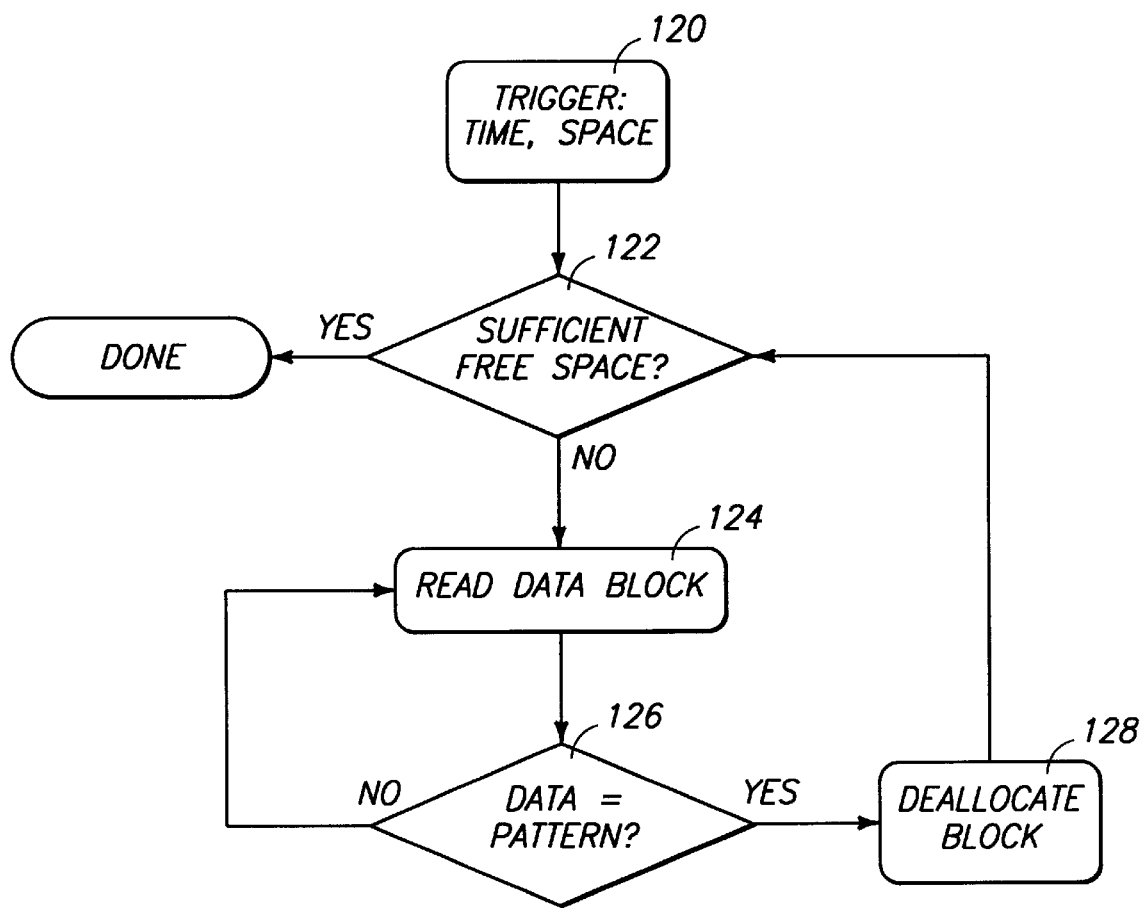
FIG. 6 is a flow diagram of steps in a method performed in background at the data storage system for deallocating storage space.

FIG. 6 shows an example implementation in which the deallocation method is executed in the data storage system as a background scrubber service. For this method, the predefined data pattern has already been written onto the physical blocks of the storage disks. The background process may be periodically triggered at specified time periods, or on occasions when a change in available storage space warrants the scrubber service (step 120). When executed, the storage space manager 66 determines whether there is sufficient free space on the storage disks (step 122 in FIG. 6). This determination step can be accomplished by comparing the quantity of free space to a threshold level of free space that the operator desires to maintain. If there is sufficient free space (i.e., the "yes" branch from step 122), the background process ends. Conversely, if the amount of free space is below the threshold level (i.e., the "no" branch from step 122), the storage space manager 66 begins reading the disks, block by block.

The storage manager 66 reads a data block (step 124 in FIG. 6) and examines whether the data read from the block consists of the predefined data pattern (step 126). If the read data is not the predefined pattern (i.e., the "no" branch from step 126), the storage space manager 66 proceeds to the next block (step 124). On the other hand, if the data read from the block consists of the data pattern (i.e., the "yes" branch from step 126), the storage space manager 66 deallocates the data block (step 128) and then proceeds back to the decision block 122. In this manner, the method continuously evaluates whether the deallocation returns the quantity of free space to an acceptable level above the threshold level. Alternatively, the method may be arranged to read multiple blocks, or even the entire disk array, before returning to the evaluation step 122.

The methods described above are advantageous in that they employ existing write/read protocols to communicate space management information between the host and data storage system. This eliminates synchronization problems between the host and data storage system because the data that is read from any storage space is always the same as the data last written to that space, regardless of whether that space is allocated or deallocated. Moreover, the methods obviate use of special commands, which must be specified for each file system, between the host and data storage system to deallocate spaces.

In compliance with the patent statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

What is claimed is:

1. A method for managing space on a data storage system, comprising the following steps:

writing a data pattern from a host computing unit to a designated storage space on the data storage system as if the data pattern itself is to be stored in the designated storage space;

detecting at the data storage system, whether the data pattern matches a predefined data pattern;

if the data pattern matches the predefined data pattern, deallocating the designated storage space; and if the data pattern fails to match the predefined data pattern, storing the data pattern in the designated storage space.

2. A method as recited in claim 1, further comprising the following steps:

determining, at the host computing unit, when the host computing unit has deallocated the designated storage space;

writing the predefined data pattern; and posting the predefined data pattern to the data storage system as if the data pattern itself is to be stored in the designated storage space.

3. The method as recited in claim 1, further comprising the step of using the designated storage space following said deallocating step.

4. The method as recited in claim 1, further comprising the following steps:

initiating, from the host computing unit, a read operation to read the designated storage space after said deallocating step; and detecting, at the data storage system, the read operation for the designated storage space.

5. A method for managing space on a data storage system, comprising the following steps:

writing a data pattern from a host computing unit to a designated storage space on the data storage system;

detecting, at the data storage system, whether the data pattern matches a predefined data pattern;

if the data pattern matches the predefined data pattern, deallocating the designated storage space;

if the data pattern fails to match the predefined data pattern, storing the data pattern in the designated storage space;

initiating, from the host computing unit, a read operation to read the designated storage space after said deallocating step;

detecting, at the data storage system, the read operation for the designated storage space; and if the designated storage space is deallocated, generating the predefined data pattern in response to said detection of the read operation of the designated storage space.

6. The method as recited in claim 1, further comprising the following steps:

initiating, from the host computing unit, a read operation to read the designated storage space after said deallocating step;

detecting, at the data storage system, the read operation for the designated storage space;

generating the predefined data pattern in response to said detection of the read operation of the designated storage space; and sending the predefined data pattern to the host computing unit.

7. The method as recited in claim 5, wherein the generating step comprises the step of reproducing the predefined data pattern without reading the designated storage space.

8. Computer-readable media having computer-executable instructions executable at the host computing unit and the data storage system for performing the steps of the method as recited in claim 1.

9. A method for operating a data storage system, comprising the following steps:

detecting a data pattern being written from a host computing unit to a designated storage space in the data storage system as if the data pattern itself is to be stored in the designated storage space;

determining whether the data pattern matches a predefined data pattern;

if the data pattern matches the predefined data pattern, deallocating the designated storage space; and if the data pattern fails to match the predefined data pattern, storing the data pattern in the designated storage space.

10. A method as recited in claim 9, further comprising the following steps:

generating the predefined data pattern in response to a read operation from the host computing unit to read data from the designated storage space; and returning the predefined data pattern in reply to the read operation.

11. A data processing unit programmed to perform the steps recited in the method of claim 9.

12. A computer-readable medium having computer-executable instructions for performing the steps of the method as recited in claim 9.

13. A data storage system, comprising:

a storage medium to store data; and a storage space manager coupled to manage storage space on the storage medium in response to requests from a host computer to read data from and write data to the storage medium, the storage space manager being configured to detect whether a data pattern being written from the host computer to a designated storage space on the storage medium to be stored in the designated storage space matches a predefined data pattern, the storage space manager being further configured to deallocate the designated storage space if the data pattern matches the predefined data pattern and to store the data pattern in the designated storage space if the data pattern fails to match the predefined data pattern.

14. A data storage system as recited in claim 13, wherein the storage space manager utilizes the designated storage space, after the designated storage space has been deallocated, to store other data.

15. A data storage system as recited in claim 13, wherein the storage space manager is configured to generate the predefined data pattern in response to a read operation from the host computer to read data from the designated storage space.

16. A data storage system as recited in claim 13, wherein the storage space manager does not physically store the data pattern in the designated storage space.

17. A method for operating a data storage system, comprising the following steps:

detecting whether a data pattern written from a host computing unit to a designated storage space in the data storage system matches a predefined data pattern;

if the data pattern matches the predefined data pattern, deallocating the designated storage space;

if the data pattern fails to match the predefined data pattern, storing the data pattern in the designated storage space;

generating the predefined data pattern in response to a read operation from the host computing unit to read data from a particular storage space that has been deallocated, wherein the generating step comprises the step of reproducing the predefined data pattern without reading the particular storage space; and returning the predefined data pattern in reply to the read operation.

18. A data storage system, comprising:

a storage medium to store data;

a storage space manager coupled to manage storage space on the storage medium in response to requests from a host computer to read data from and write data to the storage medium, the storage space manager being configured to detect whether a data pattern written from the host computer to a designated storage space on the storage medium matches a predefined data pattern, the storage space manager being further configured to deallocate the designated storage space if the data pattern matches the predefined data pattern and to store the data pattern in the designated storage space if the data pattern fails to match the predefined data pattern; and wherein the storage space manager comprises a pattern generator to generate the predefined pattern in response to a read operation to read data from a particular storage space that has been deallocated, the pattern generator generating the predefined pattern without reading the particular storage space.

19. A method for operating a data storage system, comprising the following steps:

detecting a data pattern being written from a host computing unit to a designated storage space in the data storage system as if the data pattern itself is to be stored in the designated storage space; and determining whether the data pattern matches a predefined data pattern; if the data pattern matches the predefined data pattern, deallocating the designated storage space without physically storing the data pattern in the designated storage space; and if the data pattern fails to match the predefined data pattern, physically storing the data pattern in the designated storage space.

20. A computer-readable medium having computer-executable instructions for performing the steps of the method as recited in claim 19.

21. A method for operating a data storage system, comprising the following steps:

detecting whether a data pattern written from a host computing unit to a designated storage space in the data storage system matches a predefined data pattern;

if the data pattern matches the predefined data pattern, deallocating the designated storage space without physically storing the data pattern in the designated storage space;

if the data pattern fails to match the predefined data pattern, storing the data pattern in the designated storage space;

reproducing the predefined data pattern in response to a read operation from the host computing unit to read data from a particular storage space without reading the particular storage space; and returning the predefined data pattern in reply to the read operation.

* * * * *